US009531114B2

(12) United States Patent
Ramos et al.

(10) Patent No.: US 9,531,114 B2
(45) Date of Patent: Dec. 27, 2016

(54) WATERPROOF APPARATUS FOR CABLES AND CABLE INTERFACES

(71) Applicant: Mimosa Networks, Inc., Campbell, CA (US)

(72) Inventors: Carlos Ramos, San Jose, CA (US); Wayne Miller, Los Altos, CA (US)

(73) Assignee: Mimosa Networks, Inc., Santa Clara, CA (US)

( * ) Notice: Subject to any disclaimer, the term of this patent is extended or adjusted under 35 U.S.C. 154(b) by 0 days.

(21) Appl. No.: 14/802,829

(22) Filed: Jul. 17, 2015

(65) Prior Publication Data

US 2015/0325945 A1 Nov. 12, 2015

Related U.S. Application Data

(63) Continuation of application No. 13/925,566, filed on Jun. 24, 2013, now Pat. No. 9,130,305.

(60) Provisional application No. 61/773,636, filed on Mar. 6, 2013.

(51) Int. Cl.

| | |
|---|---|
| ***H01R 13/40*** | (2006.01) |
| ***H01R 13/52*** | (2006.01) |
| ***H01R 43/00*** | (2006.01) |
| ***H01R 13/512*** | (2006.01) |

(Continued)

(52) U.S. Cl.
CPC ........ *H01R 13/5221* (2013.01); *H01R 13/512* (2013.01); *H01R 13/5202* (2013.01); *H01R 13/5205* (2013.01); *H01R 13/622* (2013.01); *H01R 43/005* (2013.01); *H01R 24/64* (2013.01); *Y10T 29/4921* (2015.01)

(58) Field of Classification Search
CPC .............. H01R 13/5205; H01R 13/521; H01R 13/5208; H01R 13/5202
USPC ......................... 439/589, 587, 274, 275, 271
See application file for complete search history.

(56) References Cited

U.S. PATENT DOCUMENTS

| | | | | |
|---|---|---|---|---|
| 2,735,993 | A * | 2/1956 | Humphrey ......... | H01R 13/6276 174/77 R |
| 3,182,129 | A | 5/1965 | Clark et al. | |
| D227,476 | S | 6/1973 | Kennedy | |

(Continued)

FOREIGN PATENT DOCUMENTS

| | | |
|---|---|---|
| CN | 303453662 S | 11/2015 |
| CN | 105191204 | 12/2015 |

(Continued)

OTHER PUBLICATIONS

Non-Final Office Action, Sep. 17, 2015, U.S. Appl. 14/741,423, filed Jun. 16, 2015.

(Continued)

*Primary Examiner* — Abdullah Riyami
*Assistant Examiner* — Vladimir Imas
(74) *Attorney, Agent, or Firm* — Carr & Ferrell LLP

(57) ABSTRACT

Waterproof apparatus for cables and cable interfaces are provided herein. An exemplary apparatus includes a coupler body that includes a first end configured to releaseably couple with a connector bulkhead and a second end having an opening that is sized to receive a sealing gland, a cavity for receiving the sealing gland, the sealing gland comprising an outer peripheral surface configured to sealingly engage with an inner surface of the cavity, the sealing gland comprising an aperture that is configured to receive a cable.

14 Claims, 3 Drawing Sheets

(51) Int. Cl.
*H01R 13/622* (2006.01)
*H01R 24/64* (2011.01)

(56) References Cited

U.S. PATENT DOCUMENTS 4,402,566 A * 9/1983 Powell ................. H01R 13/436 439/589
D273,111 S 3/1984 Hirata et al.
4,626,863 A 12/1986 Knop et al.
4,893,288 A 1/1990 Maier et al.
4,986,764 A * 1/1991 Eaby ...................... H01R 13/53 439/275
5,015,195 A * 5/1991 Piriz ...................... H01R 13/17 439/272
5,226,837 A * 7/1993 Cinibulk ............ H01R 13/5216 439/521
D346,598 S 5/1994 McCay et al.
D355,416 S 2/1995 McCay et al.
5,513,380 A 4/1996 Ivanov et al.
D375,501 S 11/1996 Lee et al.
5,580,264 A * 12/1996 Aoyama ............ H01R 13/5208 439/275
D389,575 S 1/1998 Grasfield et al.
5,746,611 A 5/1998 Brown et al.
6,014,372 A 1/2000 Kent et al.
6,137,449 A 10/2000 Kildal
6,176,739 B1 * 1/2001 Denlinger .......... H01R 13/5208 439/589
6,216,266 B1 4/2001 Eastman et al.
D455,735 S 4/2002 Winslow
6,421,538 B1 7/2002 Byrne
6,716,063 B1 * 4/2004 Bryant ............... H01R 13/5208 439/589
6,754,511 B1 6/2004 Halford et al.
6,847,653 B1 1/2005 Smiroldo
D501,848 S 2/2005 Uehara et al.
6,877,277 B2 * 4/2005 Kussel ................. H01R 13/527 439/598
6,962,445 B2 * 11/2005 Zimmel ............... G02B 6/3825 385/55
7,075,492 B1 7/2006 Chen et al.
D533,899 S 12/2006 Ohashi et al.
7,245,265 B2 7/2007 Kienzle et al.
7,264,494 B2 * 9/2007 Kennedy .............. H01R 13/405 439/274
7,281,856 B2 * 10/2007 Grzegorzewska ... G02B 6/3816 385/53
7,306,485 B2 * 12/2007 Masuzaki ............ H01R 13/523 439/587
7,324,057 B2 1/2008 Argaman et al.
D566,698 S 4/2008 Choi et al.
7,362,236 B2 4/2008 Hoiness
7,380,984 B2 * 6/2008 Wuester ................... G01K 1/08 374/141
7,431,602 B2 * 10/2008 Corona .............. H01R 13/5205 439/272
7,507,105 B1 3/2009 Peters et al.
7,542,717 B2 6/2009 Green, Sr. et al.
7,581,976 B2 * 9/2009 Liepold ..................... F16L 5/08 439/282
7,586,891 B1 9/2009 Masciulli
7,616,959 B2 11/2009 Spenik et al.
7,675,473 B2 3/2010 Kienzle et al.
7,726,997 B2 * 6/2010 Kennedy .............. H01R 13/405 310/87
7,778,226 B2 8/2010 Rayzman et al.
7,857,523 B2 * 12/2010 Masuzaki ............ H01R 13/625 385/60
7,929,914 B2 4/2011 Tegreene
RE42,522 E * 7/2011 Zimmel .......................... 385/55
8,069,465 B1 11/2011 Bartholomay et al.
D674,787 S 1/2013 Tsuda et al.
8,515,434 B1 8/2013 Narendran et al.
D694,740 S 12/2013 Apostolakis
8,777,660 B2 * 7/2014 Chiarelli ................ H01R 13/59 439/584
8,792,759 B2 * 7/2014 Benton ................ G02B 6/3816 385/101
8,827,729 B2 * 9/2014 Gunreben ............ H01R 13/658 439/188
8,836,601 B2 9/2014 Sanford et al.
8,935,122 B2 1/2015 Stisser
9,001,689 B1 4/2015 Hinman et al.
9,019,874 B2 4/2015 Choudhury et al.
9,130,305 B2 9/2015 Ramos et al.
9,161,387 B2 10/2015 Fink et al.
9,179,336 B2 11/2015 Fink et al.
9,191,081 B2 11/2015 Hinman et al.
D752,566 S 3/2016 Hinman et al.
9,295,103 B2 3/2016 Fink et al.
9,362,629 B2 6/2016 Hinman et al.
2002/0102948 A1 8/2002 Stanwood et al.
2002/0159434 A1 10/2002 Gosior et al.
2003/0013452 A1 1/2003 Hunt et al.
2003/0027577 A1 2/2003 Brown et al.
2003/0169763 A1 9/2003 Choi et al.
2003/0224741 A1 12/2003 Sugar et al.
2004/0002357 A1 1/2004 Benveniste
2004/0029549 A1 2/2004 Fikart
2004/0120277 A1 6/2004 Holur et al.
2004/0196812 A1 10/2004 Barber
2004/0240376 A1 12/2004 Wang et al.
2005/0032479 A1 2/2005 Miller et al.
2005/0124294 A1 6/2005 Wentink
2005/0143014 A1 6/2005 Li et al.
2005/0195758 A1 9/2005 Chitrapu
2005/0227625 A1 10/2005 Diener
2005/0271056 A1 12/2005 Kaneko
2006/0072518 A1 4/2006 Pan et al.
2006/0132602 A1 6/2006 Muto et al.
2006/0172578 A1 8/2006 Parsons
2006/0187952 A1 8/2006 Kappes et al.
2007/0001910 A1 1/2007 Yamanaka et al.
2007/0019664 A1 1/2007 Benveniste
2007/0060158 A1 3/2007 Medepalli et al.
2007/0173199 A1 7/2007 Sinha
2007/0173260 A1 7/2007 Love et al.
2007/0223701 A1 9/2007 Emeott et al.
2007/0238482 A1 10/2007 Rayzman et al.
2007/0255797 A1 11/2007 Dunn et al.
2007/0268848 A1 11/2007 Khandekar et al.
2008/0109051 A1 5/2008 Splinter et al.
2008/0112380 A1 5/2008 Fischer
2008/0192707 A1 8/2008 Xhafa et al.
2008/0242342 A1 10/2008 Rofougaran
2009/0046673 A1 2/2009 Kaidar
2009/0052362 A1 2/2009 Meier et al.
2009/0232026 A1 9/2009 Lu
2009/0233475 A1 9/2009 Mildon et al.
2009/0291690 A1 11/2009 Guvenc et al.
2010/0029282 A1 2/2010 Stamoulis et al.
2010/0046650 A1 2/2010 Jongren et al.
2010/0067505 A1 3/2010 Fein et al.
2010/0085950 A1 4/2010 Sekiya et al.
2010/0091818 A1 4/2010 Sen et al.
2010/0103065 A1 4/2010 Shtrom et al.
2010/0103066 A1 4/2010 Shtrom et al.
2010/0136978 A1 6/2010 Cho et al.
2010/0151877 A1 6/2010 Lee et al.
2010/0167719 A1 7/2010 Sun
2010/0171675 A1 7/2010 Borja et al.
2010/0189005 A1 7/2010 Bertani et al.
2010/0202613 A1 8/2010 Ray et al.
2010/0210147 A1 8/2010 Hauser
2010/0238083 A1 9/2010 Malasani
2010/0315307 A1 12/2010 Syed et al.
2010/0322219 A1 12/2010 Fischer et al.
2011/0006956 A1 1/2011 McCown
2011/0028097 A1 2/2011 Memik et al.
2011/0044186 A1 2/2011 Jung et al.
2011/0103309 A1 5/2011 Wang et al.
2011/0111715 A1 5/2011 Buer et al.
2011/0170424 A1 7/2011 Safavi

(56) References Cited

U.S. PATENT DOCUMENTS

| | | | |
|---|---|---|---|
| 2011/0172916 | A1 | 7/2011 | Pakzad et al. |
| 2011/0182260 | A1 | 7/2011 | Sivakumar et al. |
| 2011/0194644 | A1 | 8/2011 | Liu et al. |
| 2011/0243291 | A1 | 10/2011 | McAllister et al. |
| 2012/0008542 | A1 | 1/2012 | Koleszar et al. |
| 2012/0040700 | A1 | 2/2012 | Gomes et al. |
| 2012/0057533 | A1 | 3/2012 | Junell et al. |
| 2012/0115487 | A1 | 5/2012 | Josso |
| 2012/0134280 | A1 | 5/2012 | Rotvold et al. |
| 2012/0238201 | A1 | 9/2012 | Du et al. |
| 2012/0263145 | A1 | 10/2012 | Marinier et al. |
| 2012/0314634 | A1 | 12/2012 | Sekhar |
| 2013/0005350 | A1 | 1/2013 | Campos et al. |
| 2013/0023216 | A1 | 1/2013 | Moscibroda et al. |
| 2013/0095747 | A1 | 4/2013 | Moshfeghi |
| 2013/0128858 | A1 | 5/2013 | Zou et al. |
| 2013/0176902 | A1 | 7/2013 | Wentink et al. |
| 2013/0182652 | A1 | 7/2013 | Tong et al. |
| 2013/0195081 | A1 | 8/2013 | Merlin et al. |
| 2013/0210457 | A1 | 8/2013 | Kummetz |
| 2013/0271319 | A1 | 10/2013 | Trerise |
| 2013/0286950 | A1 | 10/2013 | Pu |
| 2013/0286959 | A1 | 10/2013 | Lou et al. |
| 2013/0288735 | A1 | 10/2013 | Guo |
| 2013/0301438 | A1 | 11/2013 | Li et al. |
| 2013/0322276 | A1 | 12/2013 | Pelletier et al. |
| 2013/0322413 | A1 | 12/2013 | Pelletier et al. |
| 2014/0024328 | A1 | 1/2014 | Balbien et al. |
| 2014/0051357 | A1 | 2/2014 | Steer et al. |
| 2014/0098748 | A1 | 4/2014 | Chan et al. |
| 2014/0145890 | A1 | 5/2014 | Ramberg et al. |
| 2014/0185494 | A1 | 7/2014 | Yang et al. |
| 2014/0198867 | A1 | 7/2014 | Sturkovich et al. |
| 2014/0206322 | A1 | 7/2014 | Dimou et al. |
| 2014/0225788 | A1 | 8/2014 | Schulz et al. |
| 2014/0233613 | A1 | 8/2014 | Fink et al. |
| 2014/0235244 | A1 | 8/2014 | Hinman |
| 2014/0253378 | A1 | 9/2014 | Hinman |
| 2014/0253402 | A1 | 9/2014 | Hinman et al. |
| 2014/0254700 | A1 | 9/2014 | Hinman et al. |
| 2014/0256166 | A1 | 9/2014 | Ramos et al. |
| 2014/0320306 | A1 | 10/2014 | Winter |
| 2014/0320377 | A1 | 10/2014 | Cheng et al. |
| 2014/0355578 | A1 | 12/2014 | Fink et al. |
| 2014/0355584 | A1 | 12/2014 | Fink et al. |
| 2015/0002335 | A1 | 1/2015 | Hinman et al. |
| 2015/0015435 | A1 | 1/2015 | Shen et al. |
| 2015/0215952 | A1 | 7/2015 | Hinman et al. |
| 2015/0256275 | A1 | 9/2015 | Hinman et al. |
| 2015/0263816 | A1 | 9/2015 | Hinman et al. |
| 2015/0319584 | A1 | 11/2015 | Fink et al. |
| 2015/0327272 | A1 | 11/2015 | Fink et al. |
| 2015/0365866 | A1 | 12/2015 | Hinman et al. |
| 2016/0149635 | A1 | 5/2016 | Hinman et al. |
| 2016/0240929 | A1 | 8/2016 | Hinman et al. |

FOREIGN PATENT DOCUMENTS

| | | |
|---|---|---|
| EP | 002640177 | 2/2015 |
| WO | WO2014137370 | 9/2014 |
| WO | WO2014138292 | 9/2014 |
| WO | WO2014193394 | 12/2014 |
| WO | WO2015112627 | 7/2015 |

OTHER PUBLICATIONS

Notice of Allowance, Jan. 11, 2016, U.S. Appl. No. 29/502,253, filed Sep. 12, 2014.

International Search Report and Written Opinion of the International Search Authority mailed Nov. 26, 2013 in Patent Cooperation Treaty Application No. PCT/US2013/047406, filed Jun. 24, 2013.

International Search Report and Written Opinion of the International Search Authority mailed Aug. 9, 2013 in Patent Cooperation Treaty Application No. PCT/US2013/043436, filed May 30, 2013.

International Search Report and Written Opinion of the International Search Authority mailed Jul. 1, 2014 in Patent Cooperation Treaty Application No. PCT/US2014/020880, filed Mar. 5, 2014.

International Search Report and Written Opinion of the International Search Authority mailed Jun. 29, 2015 in Patent Cooperation Treaty Application No. PCT/US2015/012285, filed Jan. 21, 2015.

Hinman et al., U.S. Appl. No. 61/774,632, filed Mar. 7, 2013.

First Official Notification mailed Jun. 15, 2015 in Chinese Design Patent Application 201530058063.8, filed Mar. 11, 2015.

Non-Final Office Action, Jan. 5, 2015, U.S. Appl. No. 14/183,445, filed Feb. 18, 2014.

Notice of Allowance, Jul. 13, 2015, U.S. Appl. No. 14/183,445, filed Feb. 18, 2014.

Non-Final Office Action, Jan. 15, 2015, U.S. Appl. No. 14/183,329, filed Feb. 18, 2014.

Non-Final Office Action, Mar. 18, 2015, U.S. Appl. No. 14/183,375, filed Feb. 18, 2014.

Non-Final Office Action, Jan. 2, 2015, U.S. Appl. No. 13/925,566, filed Jun. 24, 2013.

Notice of Allowance, Jul. 15, 2015, U.S. Appl. No. 13/925,556, filed Jun. 24, 2013.

Non-Final Office Action, Dec. 11, 2013, U.S. Appl. No. 13/906,128, filed May 30, 2013.

Final Office Action, Apr. 15, 2014, U.S. Appl. No. 13/906,128, filed May 30, 2013.

Advisory Action, Jul. 31, 2014, U.S. Appl. No. 13/906, 128, filed May 30, 2013.

Non-Final Office Action, Aug. 25, 2014, U.S. Appl. No. 13/906,128, filed May 30, 2013.

Final Office Action, Mar. 23, 2015, U.S. Appl. No. 13/906,128, filed May 30, 2013.

Non-Final Office Action, Jun. 16, 2015, U.S. Appl. No. 14/164,081, filed Jan. 24, 2014.

Notice of Allowance, Dec. 30, 2014, U.S. Appl. No. 14/164,081, filed Jan. 24, 2014.

Non-Final Office Action, Dec. 24, 2013, U.S. Appl. No. 14/045,741, filed Oct. 3, 2013.

Final Office Action, Apr. 16, 2014, U.S. Appl. No. 14/045,741, filed Oct. 3, 2013.

Non-Final Office Action, Sep. 22, 2014, U.S. Appl. No. 14/045,741, filed Oct. 3, 2013.

Notice of Allowance, Jun. 3, 2015, U.S. Appl. No. 14/045,741, filed Oct. 3, 2013.

Notice of Allowance mailed Sep. 8, 2015 in Chinese Design Patent Application 201530058063.8, filed Mar. 11, 2015.

Notice of Allowance, Aug. 19, 2015, U.S. Appl. No. 14/183,329, filed Feb. 18, 2014.

Non-Final Office Action, Sep. 10, 2015, U.S. Appl. No. 14/198,378, filed Mar. 5, 2014.

Final Office Action, Nov. 24, 2015, U.S. Appl. No. 14/183,375, filed Feb. 18, 2014.

Notice of Allowance, Oct. 26, 2015, U.S. Appl. No. 13/906,128, filed May 30, 2013.

Notice of Allowance, Jul. 26, 2016, U.S. Appl. No. 14/325,307, filed Jul. 7, 2014.

Non-Final Office Action, Sep. 15, 2016, U.S. Appl. No. 14/183,375, filed Feb. 18, 2014.

Non-Final Office Action, Sep 30, 2016, U.S. Appl. No. 14/657,942, filed Mar. 13, 2015.

Final Office Action, Oct. 12, 2016, U.S. Appl. No. 14/741,423, filed Jun. 16, 2015.

Final Office Action, Oct. 17, 2016, U.S. Appl. No. 14/639,976, filed Mar. 5, 2015

Non-Final Office Action, Oct. 26, 2016, U.S. Appl. No. 15/139,225, filed Apr. 26, 2016.

* cited by examiner

WATERPROOF APPARATUS FOR CABLES AND CABLE INTERFACES

CROSS REFERENCE TO RELATED APPLICATIONS

This non-provisional utility patent application is a continuation application of U.S. patent application Ser. No. 13/925,566, filed on Jun. 24, 2013, entitled "Waterproof Apparatus for Cables and Cable Interfaces" that issued as U.S. Pat. No. 9,130,305 on Sep. 8, 2015, which is incorporated by references in its entirety including all references cited therein, which claims the priority benefit of U.S. Provisional Application Ser. No. 61/773,636, filed on Mar. 6, 2013, entitled "Plastic Gland for Weatherproof Ethernet Connectivity" which is hereby incorporated by reference herein in its entirety, including all references cited therein.

FIELD OF THE INVENTION

The present technology relates to systems and methods for coupling cables. More specifically, but not by way of limitation, the present technology relates to waterproof apparatuses for cables and cable interfaces.

BACKGROUND

In general, the installation of a data transmission cable requires the use of connectors that are coupled with terminal ends of the transmission cable. The cable and connectors cooperate to couple two or more data transmission terminals together. Due to cable size variability and connector interface type, technicians fabricate or "re-terminate" cables with connectors in the field. Exemplary cables include Category (CAT) 5E, Category 6, Category 7, Category 7 Direct Burial, and so forth. Exemplary connector interfaces include RJ45 through GG45. Connector housings that hold the cable and the connector interface may interface with a connector bulkhead, which typically includes a male or female connector interface that is complimentary to the connector interfaces that are coupled with the cable.

SUMMARY

According to some embodiments, the present technology is directed to an apparatus, comprising a coupler body that includes a first end configured to releaseably couple with a connector bulkhead and a second end having an opening that is sized to receive a sealing gland, a cavity for receiving the sealing gland, the sealing gland comprising an outer peripheral surface configured to sealingly engage with an inner surface of the cavity, the sealing gland comprising an aperture that is configured to receive a cable.

According to some embodiments, the present technology is directed to a method for waterproofing a pre-terminated cable and connector. The method comprises: (a) threading the pre-terminated cable and connector through a coupler cap having an angled inner sidewall; (b) placing a sealing gland around the pre-terminated cable in such a way that the sealing gland encircles a section of the pre-terminated cable to form a waterproof seal between the sealing gland and the cable; (c) threading the pre-terminated cable and connector into a coupler body that includes a first end configured to releaseably couple with a connector bulkhead and a second end having a plurality of tabs that form a recess; (d) disposing the sealing gland within the recess; and (e) engaging the coupler cap with the second end of the coupler body such that the plurality of tabs are compressed against the sealing gland by the angled inner sidewall of the coupler cap.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DESCRIPTION OF EXEMPLARY EMBODIMENTS

Figure 1:
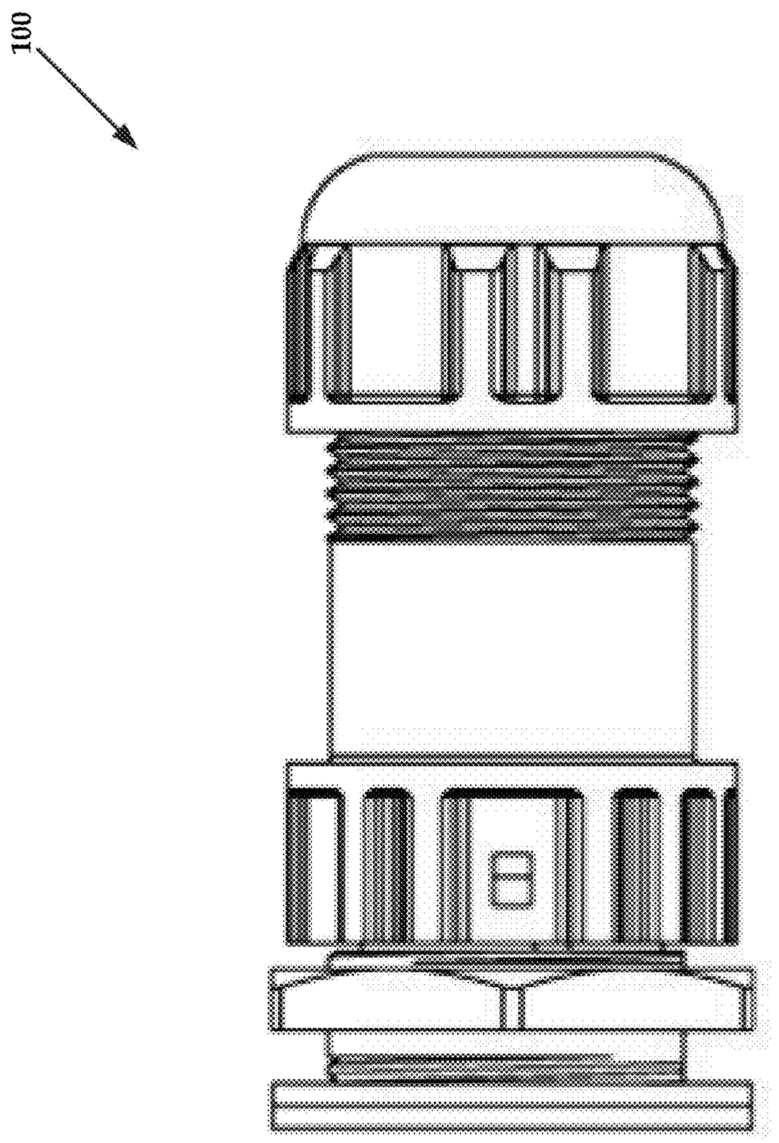
FIG. 1 is a perspective view of a waterproof apparatus for a cable and a cable interface, constructed in accordance with the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In particular, the present system and method provides a secure method for waterproof coupling of connectors of different sizes that provides strain relief. The present technology provides a plastic gland that weatherizes and provides strain relief to a pre-terminated Ethernet cable attached to a bulkhead connector.

Conventional waterproof couplers often require parts that are specific to the type of cable being connected. This may create a large increase in the number of parts required on-hand by an installing technician. Additionally, waterproof connections often require re-termination of the cable. Re-terminating a cable in the field can cause contamination of the cable leading to reduced transmission capabilities, as well as being time-consuming and tedious. High speed data connections require bigger cables, which leads to even a greater number of parts using conventional waterproof connectors specifically adapted to a specific cable size. A larger range for waterproof connectors is advantageous for accommodating the current wide range of cable sizes, as well as future cables having larger sizes. For example, RJ45 is not a weatherproof connector, and may require waterproofing in various installations. The RJ45 connector, while ubiquitous for data communications applications, is not designed for extended outdoor use.

The present technology provides a waterproof cover that attaches over the top of the RJ45 connection and makes it waterproof. The present technology accommodates pre-terminated cables, thereby avoiding re-termination of cables in the field. Additionally, the present technology works with various cable sizes including CAT 5E, CAT 6, CAT 7, CAT 7 Direct Burial, and various connector and coupler sizes including RJ45 through GG45.

Prior art cable connectors require sliding cable through a rubber grommet, which typically do not have a large dynamic range. The present technology provides a split grommet having a large dynamic range, for instance closed cell foam. The split grommet is put over the cable, and then a piece on the back is screwed to tighten and seal the coupling between the grommet and the cable. Pressure is applied to and carried by the housing over the seal. The split enables the plastic gland provided herein to be used with a pre-terminated cable, since the connector need not fit through the grommet, but instead the grommet is slid over the cable using the split.

A lock is formed using a bayonet arrangement that does not need to be waterproof. The lock is thereby reduced to two pieces, compared with a three piece lock in prior art, since there is no requirement of weather proofing on the lock. The lock bayonet thereby reduces the number of parts. A hole in the side of the enclosure for accessing the lock does not impair the weather proofing of the cable connection.

An advantage of the present technology includes a reduced part count, as well as a bulkhead enclosure that provides secure weather proofing. One grommet may be used, which may be split and made of closed cell foam (having a durometer, for example, of approximately 40), rather than hard rubber (which may have a durometer, for example, of approximately 80). The exemplary grommet provided herein may therefore accommodate a wide dynamic range, including CAT 5E, CAT 6, CAT 7, CAT 7 Direct Burial.

The waterproof plastic gland provided herein may also reduce strain on the connector by carrying the load from one cable to the next without relying on the strength of the connector. Strain relief of the connector is a significant additional benefit when the cable is hanging, for instance hanging off the side of a building or house.

Figure 2:
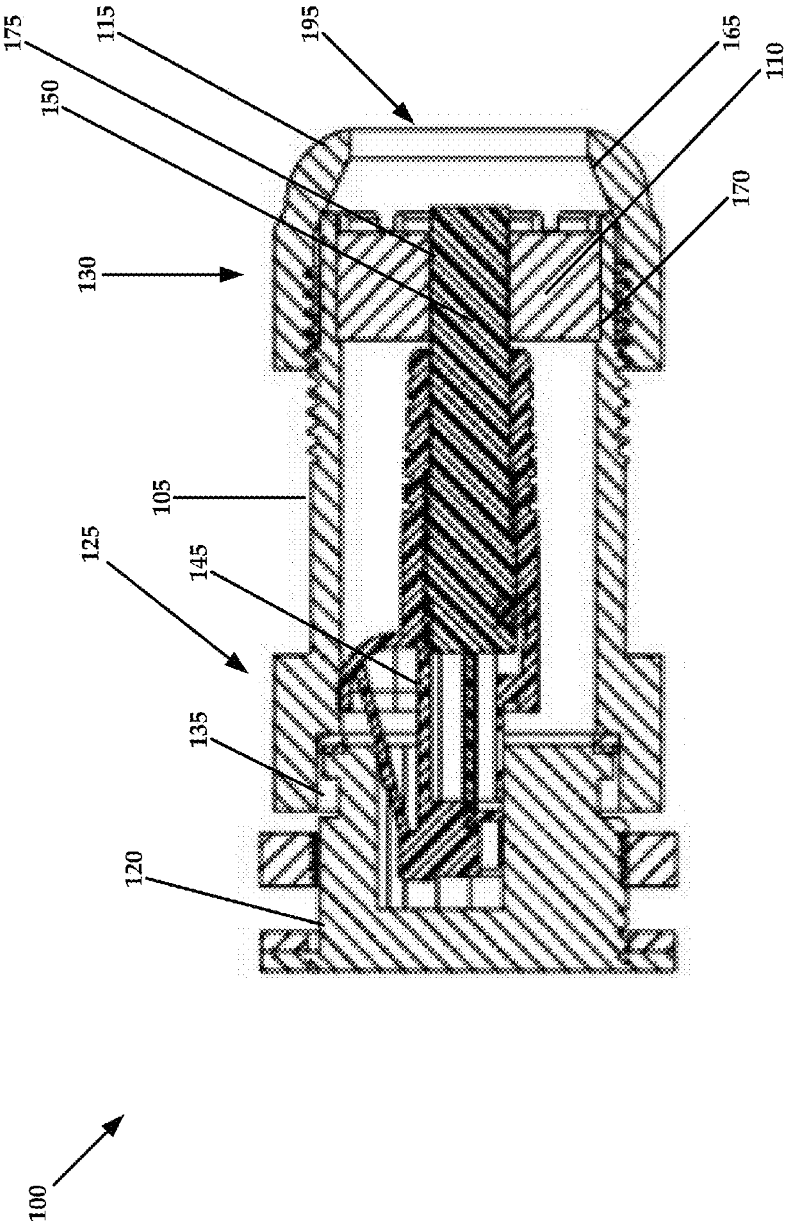
FIG. 2 is a cross-sectional view of the waterproof apparatus of FIG. 1.
Figure 3:
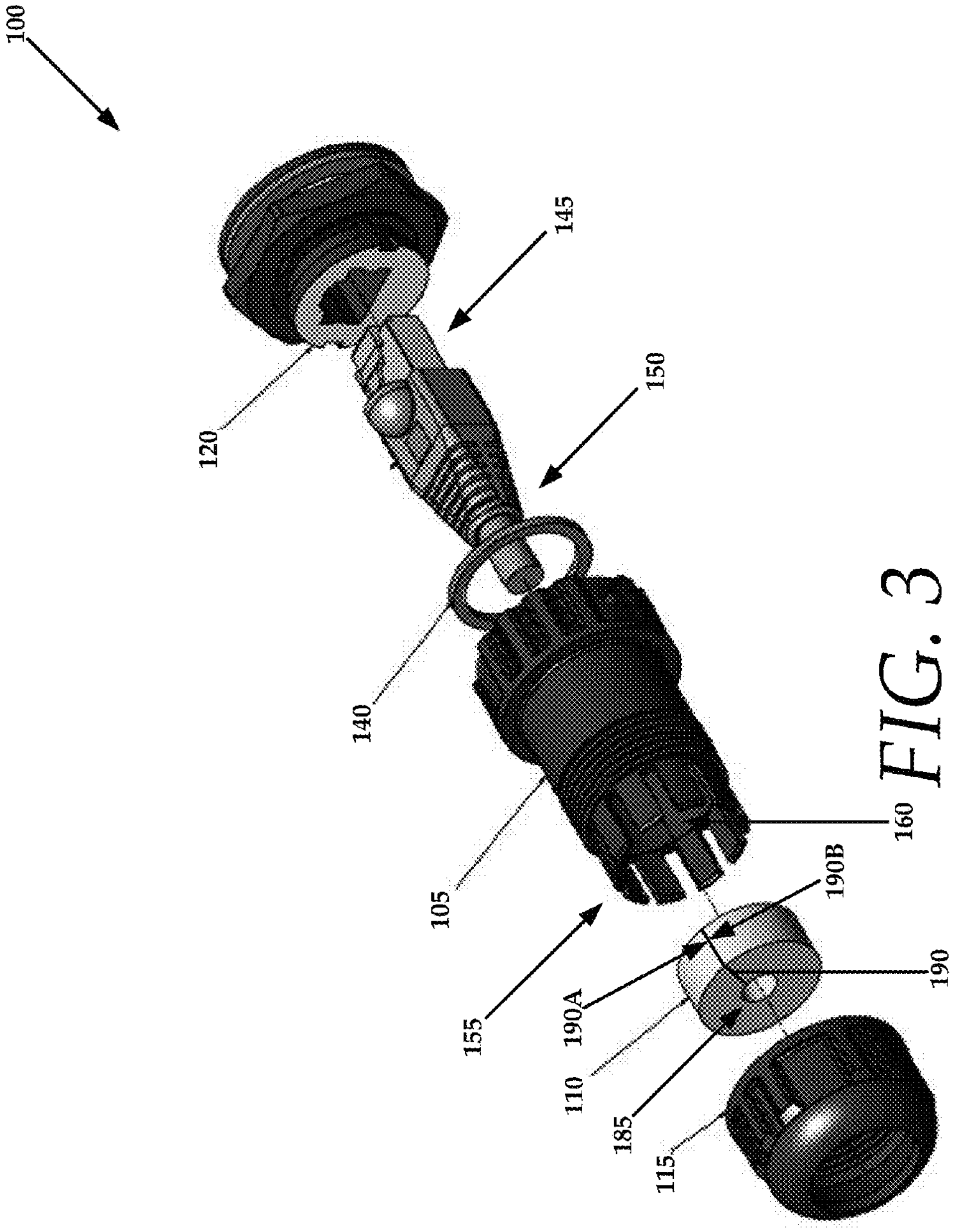
FIG. 3 is an exploded perspective view of the apparatus of FIGS. 1 and 2.

Referring now to the drawings, and more particularly to FIGS. 1-3, which collectively illustrate an exemplary apparatus 100. Generally, the apparatus 100 comprises a coupler body 105, a sealing gland 110, and a coupler cap 115. The coupler body 105 is configured to couple with a connector bulkhead 120, as will be described in greater detail below.

According to some embodiments, the coupler body 105 comprises a first end 125 and a second end 130 that are spaced apart from one another to define a tubular passage. The first end 125 may comprise an interface, such as a bayonet lock 135 that is configured to lockingly engage with a complementary groove of the connector bulkhead 120. Although a bayonet lock has been described, one of ordinary skill in the art will appreciate that other mechanisms for coupling and/or locking the first end 125 and the connector bulkhead 120 are likewise contemplated for use in accordance with the present technology.

To create a waterproof seal between the first end 125 and the connector bulkhead 120, a sealing gasket 140 (see FIG. 3) is disposed there between. Thus, when the first end 125 and the connector bulkhead 120 are coupled together using the bayonet lock 135, a waterproof seal is formed there between. As is shown in FIG. 3, the connector bulkhead 120 is shown as comprising a bulkhead connector interface that receives a connector 145 that is coupled to a cable 150. That is, the cable 150 is pre-terminated with a connector 145.

The second end 130 of the coupler body 105 may comprise a plurality of tabs 155 that extend from the second end 130. In some embodiments, the plurality of tabs 155 are each substantially arcuate in shape and collectively form a ring that extends from the second end 130. This ring comprised of the plurality of tabs 155 forms a cavity or recess 160 that is configured to receive the sealing gland 110. In some embodiments, the second end 130 may not include the plurality of tabs 155, such that the sealing gland 110 is inserted directly into a cavity of the second end 130.

According to some embodiments, the coupler cap 115 is configured to couple with the second end 130 and enclose the second end 130 to retain the sealing gland 110 therein. In some instances, the coupler cap 115 is configured to engage with the plurality of tabs 155 of the second end 130 to secure the sealing gland 110. More specifically, the coupler cap 115 may be substantially dome-shaped, having an angled inner sidewall 165. In some embodiments, the inner sidewall 165 is substantially frusto-conical shaped. When the coupler cap 115 is threadably engaged with the second end 130, the plurality of tabs 155 engage with the inner sidewall 165 of the coupler cap 115 and are compressed by the inner sidewall 165, against the sealing gland 110. This compression of the sealing gland 110 by the plurality of tabs 155 creates a waterproof seal between the sealing gland 110 and an inner surface 170 of the second end 130. As will be discussed in greater detail below, the compression of the sealing gland 110 by the plurality of tabs 155 also causes the sealing gland 110 to compress an outer peripheral surface 175 of a section of the cable 150 that has been associated with the sealing gland 110.

In some embodiments, the sealing gland 110 comprises a section of compressible, foam-like material that is fabricated from a waterproof, water resistant, or water repellant material. The sealing gland 110 may be advantageously fabricated from a closed cell foam, although one of ordinary skill in the art will appreciate that the sealing gland may be fabricated from any number of materials, so long as the material is compressible and capable of forming a waterproof seal between the inner sidewall of a coupler body and the outer sidewall of a cable.

In accordance with the present disclosure, the sealing gland 110 may comprise an annular ring of a closed cell foam, where the sealing gland 110 comprises a given thickness that varies according to design requirements. The sealing gland 110 includes a hole or aperture 185 that is sized to receive a section of a cable, such as the pre-terminated cable 150. The sealing gland 110 also includes a slit 190 that allows the sealing gland 110 to be pressed over the cable 150, where the cable 150 travels through the slit 190 such that the cable 150 is received within the aperture 185. The sealing gland 110 comprises a first surface 190A and a second surface 190B formed by the slit 190.

Advantageously, the sealing gland 110 encircles the section of the cable 150 and forms a waterproof interface therebetween. Because the sealing gland 110 is made from a foam material that is waterproof, the aperture 185 of the sealing gland 110 is capable of receiving cables of varying diameter. Cables of larger diameter are readily compressed by the sealing gland 110, while cables of relatively smaller diameter may require compression of the sealing gland 110 by the coupler cap 115.

Additionally, because the sealing gland 110 is fabricated from a resilient material, the first and second surfaces 190A and 190B are contiguous (e.g., touching) after the cable 150 to passes through the slit 190.

Moreover, sealing gland 110 is free to slide along the cable 150, which is advantageous when assembling the apparatus 100, as will be described in greater detail below.

In some embodiments, the coupler cap 115 may comprise an open end 195 that is sized to receive a pre-terminated cable 150. That is, the open end 195 may be sized to receive not only the cable 150, but also the connector 145 that has been associated with the cable 150. Even though the coupler cap 115 includes the open end 195, the sealing gland 110 prevents water or other contaminates from contaminating the coupler body 105, the connector 145, or the connector bulkhead 120.

In operation, the pre-terminated cable 150 is threaded through the open end 195 of the coupler cap 115. The sealing gland 110 is associated with a section of the cable 150 by aligning the slit 190 of the sealing gland 110 with the section and pressing the sealing gland 110 onto the cable 150 until the cable 150 is received within the aperture 185 of the sealing gland 110. Next, the connector 145 may be joined with the connector bulkhead 120. It is noteworthy that in some instances, a sealing gasket 140 may be disposed between the first end 125 the connector bulkhead 120, before the first end 125 of the coupler body 105 is coupled to the connector bulkhead 120.

The sealing gland 110 is positioned within the cavity 160 formed by the plurality of tabs 155. To secure the sealing gland 110 and create a waterproof seal between the second end 130, the sealing gland 110, and the cable 150, the coupler cap 115 is coupled with the second end 130. Again, coupling the coupler cap 115 with the second end 130 causes the angled inner sidewall 165 of the coupler cap 115 to engage with the ends of the plurality of tabs 155, compressing the plurality of tabs 155 inwardly towards the cable 150, while also compressing the sealing gland 110 against the cable 150.

Other methods for compressing the sealing gland 110 may include a band or clip that is configured to cinch down against the plurality of tabs 155. As mentioned above, the sealing gland 110 may not include the plurality of tabs 155. The sealing gland 110 may be deformed or compressed by the user and inserted into the second end 130. The resiliency of the material of the sealing gland 110 will cause the sealing gland 110 to expand and fill the second end 130, creating the waterproof interface.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. An apparatus, comprising a coupler body that includes a first end configured to releaseably couple with a connector bulkhead and a second end having an opening that is sized to receive a sealing gland, a cavity for receiving the sealing gland, the sealing gland comprising an outer peripheral surface configured to sealingly engage with an inner surface of the cavity, the sealing gland comprising an aperture that is configured to receive a cable, the connector bulkhead comprising a bulkhead connector interface that receives a pre-terminated connector of the cable.

2. The apparatus according to claim 1, further comprising a sealing gasket associated with the first end of the coupler body, the sealing gasket forming a waterproof seal between the first end of the coupler body and the connector bulkhead.

3. The apparatus according to claim 1, wherein the coupler body further comprises:

a plurality of tabs that extend from the second end of the coupler body, the plurality of tabs forming a recess that receives the sealing gland; and a coupler cap that is configured to releaseably engage with the second end of the coupler body, the coupler cap having a domed profile that causes the plurality of tabs to compress against the sealing gland when the coupler cap is engaged with the second end.

4. The apparatus according to claim 3, wherein each of the plurality of tabs is arcuate.

5. The apparatus according to claim 3, wherein the coupler cap comprises a frusto-conical inner sidewall.

6. The apparatus according to claim 1, wherein the sealing gland is an annular member having a slit that allows a cable to pass therethrough, allowing the sealing gland to encircle the cable in a waterproof manner.

7. The apparatus according to claim 6, wherein the sealing gland comprises a first surface and a second surface formed by the slit, the first and second surfaces being contiguous after the cable to passes through the slit.

8. The apparatus according to claim 1, wherein the first end comprises a bayonet arrangement that lockingly engages with the connector bulkhead.

9. The apparatus according to claim 1, wherein the cable comprises any of Category 5E, Category 6, Category 7, and Category 7 Direct Burial.

10. The apparatus according to claim 1, wherein the sealing gland comprises a closed cell foam.

11. A method for waterproofing a pre-terminated cable and a connector, the method comprising:

threading the pre-terminated cable and the connector through a coupler cap having an angled inner sidewall;

placing a sealing gland around the pre-terminated cable in such a way that the sealing gland encircles a section of the pre-terminated cable to form a waterproof seal between the sealing gland and the pre-terminated cable;

threading the pre-terminated cable and the connector into a coupler body that includes a first end configured to releaseably couple with a connector bulkhead and a second end having a plurality of tabs that form a recess;

engaging a pre-terminated connector of the pre-terminated cable with a bulkhead connector interface of the connector bulkhead;

disposing the sealing gland within the recess; and engaging the coupler cap with the second end of the coupler body such that the plurality of tabs are compressed against the sealing gland by the angled inner sidewall of the coupler cap.

12. The method according to claim 11, further comprising:

associating a sealing gasket with the first end of the coupler body; and coupling the first end of the coupler body with the connector bulkhead, the sealing gasket forming a waterproof barrier between the first end and the connector bulkhead.

13. The method according to claim 11, further comprising pre-terminating the cable by coupling the pre-terminated cable with the connector.

14. The method according to claim 11, wherein placing a sealing gland around the pre-terminated cable comprises aligning the section of the pre-terminated cable with a slit of the sealing gland; and pushing the sealing gland through the slit and onto the section of the pre-terminated cable.

* * * * *